(12) United States Patent
Ma et al.

(10) Patent No.: US 12,230,800 B2
(45) Date of Patent: Feb. 18, 2025

(54) SECONDARY BATTERY AND APPARATUS CONTAINING THE SECONDARY BATTERY

(71) Applicant: Contemporary Amperex Technology Co., Limited, Ningde (CN)

(72) Inventors: Jianjun Ma, Ningde (CN); Rui Shen, Ningde (CN); Libing He, Ningde (CN); Baojian Zhu, Ningde (CN); Lei Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 288 days.

(21) Appl. No.: 17/547,280

(22) Filed: Dec. 10, 2021

(65) Prior Publication Data

US 2022/0102724 A1 Mar. 31, 2022

Related U.S. Application Data

(63) Continuation of application No. PCT/CN2020/081690, filed on Mar. 27, 2020.

(51) Int. Cl.
*H01M 4/587* (2010.01)
*H01M 4/505* (2010.01)
(Continued)

(52) U.S. Cl.
CPC .......... *H01M 4/587* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS 11,114,670 B2 * 9/2021 Lee ................ H01M 4/364
2017/0062822 A1 3/2017 Hwang
(Continued)

FOREIGN PATENT DOCUMENTS

CN 1507092 A 6/2004
CN 106410144 A 2/2017
(Continued)

OTHER PUBLICATIONS

The First Office Action for Chinese Application No. 202080005562. 9, dated Jun. 23, 2022, 21 pages.
(Continued)

*Primary Examiner* — Tracy M Dove
(74) *Attorney, Agent, or Firm* — Kilpatrick Townsend & Stockton LLP

(57) ABSTRACT

This application discloses a secondary battery including a positive electrode plate and a negative electrode plate, wherein the positive electrode plate comprises a positive electrode current collector and a positive electrode film disposed on a surface of the positive electrode current collector and comprising a positive active material, the negative electrode plate comprises a negative electrode current collector and a negative electrode film disposed on a surface of the negative electrode current collector and comprising a negative active material. The positive active material comprises one or more of layered lithium transition metal oxides and modified compounds thereof, and a resistance R of the negative electrode plate satisfies: 6.0 m$\Omega \leq$R$\leq$12.0 m$\Omega$; or the positive active material comprises one or more of lithium-containing phosphates with olivine structure and modified compounds thereof, and a resistance R of the negative electrode plate satisfies: 3.0 m$\Omega \leq$R$\leq$7.0 m$\Omega$.

16 Claims, 2 Drawing Sheets

(51) Int. Cl.
  *H01M 4/525* (2010.01)
  *H01M 4/58* (2010.01)
  *H01M 10/0525* (2010.01)
  *H01M 4/02* (2006.01)

(52) U.S. Cl.
  CPC ..... *H01M 4/5825* (2013.01); *H01M 10/0525* (2013.01); *H01M 2004/021* (2013.01); *H01M 2004/027* (2013.01); *H01M 2004/028* (2013.01); *H01M 2220/20* (2013.01)

(56) References Cited

U.S. PATENT DOCUMENTS

| | | | |
|---|---|---|---|
| 2019/0267609 | A1 | 8/2019 | Li et al. |
| 2020/0152964 | A1* | 5/2020 | Li .......... H01M 4/505 |

FOREIGN PATENT DOCUMENTS

| | | | |
|---|---|---|---|
| CN | 108281639 | A | 7/2018 |
| CN | 108281656 | A | 7/2018 |
| CN | 108666525 | A | 10/2018 |
| CN | 108807848 | A | 11/2018 |
| CN | 108963256 | A | 12/2018 |
| CN | 109390588 | A | 2/2019 |
| CN | 109494349 | A | 3/2019 |
| CN | 109704323 | A | 5/2019 |
| CN | 109888368 | * | 5/2019 |
| CN | 109704323 | * | 6/2019 |
| CN | 109888368 | A | 6/2019 |
| EP | 3561913 | A1 | 10/2019 |
| JP | 2012114076 | A | 6/2012 |
| JP | 2016532241 | A | 10/2016 |
| JP | 2019175650 | A | 10/2019 |
| KR | 1020180006054 | A | 1/2018 |
| WO | 2008131631 | A1 | 11/2008 |
| WO | 2014024473 | A1 | 2/2014 |

OTHER PUBLICATIONS

The Second Office Action for Chinese Application No. 202080005562.9, dated Aug. 3, 2022, 10 pages.
The extended European search report for EP Application No. 20927860.5, dated Jun. 3, 2022, 6 pages.
The First Office Action for Japanese Application No. 2022-532600, dated May 29, 2023, 3 pages.
The Third Office Action for Chinese Application No. 202080005562.9, dated Oct. 14, 2022, 7 pages.
The Notification to Grant Patent Right for Invention for Chinese Application No. 202080005562.9, dated Dec. 26, 2022, 7 pages.
The First Office Action for European Application No. 20927860.5, dated Nov. 28, 2022, 4 pages.
The First Office Action for Indian Application No. 202217030869, dated Nov. 11, 2022, 7 pages.
The International search report for PCT Application No. PCT/CN2020/081690, dated Jan. 4, 2021, 12 pages.
The First Office Action for Korean Application No. 10-2022-7018082, dated Feb. 1, 2024, 16 pages.

* cited by examiner

SECONDARY BATTERY AND APPARATUS CONTAINING THE SECONDARY BATTERY

CROSS-REFERENCE TO RELATED APPLICATION

This application is a continuation of International Application No. PCT/CN2020/081690, filed on Mar. 27, 2020, which is incorporated herein by reference in its entirety.

TECHNICAL FIELD

This application belongs to the technical field of energy storage devices, and specifically relates to a secondary battery and an apparatus containing the secondary battery.

BACKGROUND

Secondary batteries are wildly used due to their outstanding features such as reliable working performance, no pollution and no memory effect. For example, with increasing attention to environmental protection issue and increasing popularity of new energy vehicles, the demand for secondary power battery will show explosive growth. However, as the application field of the secondary battery becomes more and more widespread, higher demand is put forward for low-temperature power performance and energy density of the secondary battery. When the low temperature power performance of the secondary battery is worse, the use of the secondary battery in a low temperature environment is affected. The energy density will affect the endurance capacity of the battery, i.e. usable time after one charging process. Therefore, it is an urgent technical problem to be solved that how to improve the low temperature power performance of the secondary battery while maintaining higher energy density thereof.

SUMMARY

A first aspect of this application provides a secondary battery which includes a positive electrode plate and a negative electrode plate, the positive electrode plate including a positive electrode current collector and a positive electrode film that is disposed on at least one surface of the positive electrode current collector and comprises a positive active material, the negative electrode plate including a negative electrode current collector and a negative electrode film that is disposed on at least one surface of the negative electrode current collector and comprises a negative active material. The negative active material includes a first material and a second material, the first material icomprising artificial graphite, the second material comprising natural graphite; the positive active material comprises one or more of layered lithium transition metal oxides and modified compounds thereof; the negative electrode plate has a resistance R satisfying: $6.0\ m\Omega \leq R \leq 12.0\ m\Omega$.

A second aspect of this application provides a secondary battery which includes a positive electrode plate and a negative electrode plate, the positive electrode plate including a positive electrode current collector and a positive electrode film that is disposed on at least one surface of the positive electrode current collector and comprises a positive active material, the negative electrode plate including a negative electrode current collector and a negative electrode film that is disposed on at least one surface of the negative electrode current collector and comprises a negative active material. The positive active material includes one or more of lithium-containing phosphates with olivine structure and modified compounds thereof; the negative active material includes a first material and a second material, the first material comprising artificial graphite, the second material comprising natural graphite; the negative electrode plate has a resistance R satisfying: $3.0\ m\Omega \leq R \leq 7.0\ m\Omega$.

A third aspect of this application provides an apparatus which comprises the secondary battery according to the first and/or second aspect of this application.

It is found surprisingly that, in the secondary battery of the present application, when the positive electrode film includes a certain type of positive active material, the negative active material of the negative electrode film includes artificial graphite and natural graphite both, and the resistance of the negative electrode plate is controlled within a certain range, the negative electrode plate can have higher energy density, and improved active ions transmission and electronic conductivity performance, so that the secondary battery can have higher low temperature power performance while having higher energy density. More preferably, the secondary battery can further have lower high-temperature cyclic expansion and higher high-temperature storage performance at the same time. The apparatus in this application includes the secondary battery provided in this application and thus has the same advantages as the secondary battery at least.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

DETAILED DESCRIPTION

Figure 1:
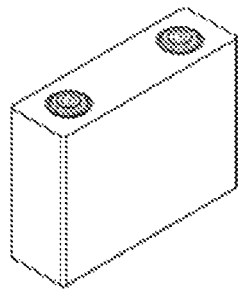
FIG. 1 is a schematic diagram of an embodiment of a secondary battery.

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Secondary Battery

A first aspect of this application provides a secondary battery. The secondary battery comprises a positive electrode plate, a negative electrode plate and an electrolyte. During the charging and discharging process of the battery, active ions intercalate and deintercalate between the positive electrode plate and the negative electrode plate. The electrolyte serves as conducting ions between the positive electrode plate and the negative electrode plate.

[Positive Electrode Plate]

A positive electrode plate may comprise a positive electrode current collector and a positive electrode film disposed on at least one surface of the positive electrode current collector. As an example, the positive electrode current collector has two opposite surfaces in the direction of its thickness, and the positive electrode film is laminated on either or both of the two surfaces of the positive electrode current collector.

The positive electrode current collector can adopt materials with good conductivity and mechanical strength, serving as conducting electricity and collecting current. In some embodiments, the positive electrode current collector may adopt an aluminum foil.

The positive electrode film comprises a positive active material. The positive active material can adopt positive active materials known for secondary battery in the art. In some embodiments, the positive active material may comprise one or more of layered lithium transition metal oxides and modified compounds thereof, lithium-containing phosphates with olivine structure and modified compounds thereof.

In the present application, the "modified" in the "modified compounds" means that the material is modified by doping and/or surface coating.

In some embodiments, the positive active material comprises layered lithium transition metal oxides and modified compounds thereof. As an example, the layered lithium transition metal oxides may comprise, but not be limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and their modified compounds. Preferably, the layered lithium transition metal oxides comprise one or more of lithium nickel cobalt manganese oxide, lithium nickel cobalt aluminum oxides and their modified compounds.

In some preferred embodiments, the positive active material comprises one or more of $Li_aNi_bCO_cM_dM'_eO_fA_g$ and modified $Li_aNi_bCo_cM_dM'_eO_fA_g$ with a coating layer on at least part of its surface. $0.8 \leq a \leq 1.2$, $0.5 \leq b < 1$, $0 < c < 1$, $0 < d < 1$, $0 \leq e \leq 0.1$, $1 \leq f \leq 2$, $0 \leq g \leq 1$; M is one or more selected from Mn and Al; M' is one or more selected from Zr, Al, Zn, Cu, Cr, Mg, Fe, V, Ti and B; A is one or more selected from N, F, S and Cl.

In some embodiments, M is selected from Mn, and M' is one or more selected from Zr, Al, Zn, Cu, Cr, Mg, Fe, V, Ti and B, preferably comprises one or more selected from Zr, Al, Zn and B. Alternatively, M is selected from Al, and M' is one or more selected from Zr, Zn, Cu, Cr, Mg, Fe, V, Ti, and B, preferably comprises one or more selected from Zr, Zn and B.

The positive active material comprises a high nickel ternary positive active material, and thus can have higher gram capacity, thereby increasing the energy density of the battery.

In some embodiments, the coating layer can be found on 80% to 100% of the surface of $Li_aNi_bCo_cM_dM'_eO_fA_g$ material. Further, the coating layer can be found on 90% to 100% of the surface of $Li_aNi_bCo_cM_dM'_eO_fA_g$ material.

In other embodiments, the positive active material comprises one or more of lithium-containing phosphates with olivine structure and modified compounds thereof. As a specific example, the lithium-containing phosphates with olivine structure may comprise, but not be limited to one or more of lithium iron phosphate, a composite of lithium iron phosphate with carbon, lithium manganese phosphate, a composite of lithium manganese phosphate with carbon. Preferably, the lithium-containing phosphates with olivine structure comprise one or more of lithium iron phosphate, a composite of lithium iron phosphate with carbon.

The composite of lithium iron phosphate with carbon can be one or more of a coated composite and an embedded composite. The coated composite means that at least part of the surface of lithium iron phosphate particles has a carbon coating layer. For example, the carbon coating layer is coated on 80% to 100% (such as from 90% to 100%) of the surface of lithium iron phosphate particles. The carbon coating layer may comprise one or more of graphite, hard carbon, soft carbon, carbon black, coke, and the like. The embedded composite means that lithium iron carbonate is dispersed in a carbon carrier. The carbon carrier may comprise one or more of graphite, hard carbon, soft carbon, carbon black, coke, and the like.

The composite of lithium manganese phosphate with carbon can be one or more of a coated composite and an embedded composite. The coated composite means that at least part of the surface of lithium manganese phosphate particles has a carbon coating layer. For example, the carbon coating layer is coated on 80% to 100% (such as from 90% to 100%) of the surface of lithium manganese phosphate particles. The carbon coating layer may comprise one or more of graphite, hard carbon, soft carbon, carbon black, coke, and the like. The embedded composite means that lithium manganese carbonate is dispersed in a carbon carrier. The carbon carrier may comprise one or more of graphite, hard carbon, soft carbon, carbon black, coke, and the like.

In some embodiments, the positive electrode film may also comprise an optional binder. The type of binder is not specifically limited, and may be chosen by those skilled in the art according to actual needs. As an example, the binder used for the positive electrode film may comprise one or more of the polyvinylidene fluoride (PVDF) and polytetrafluoroethylene (PTFL).

In some embodiments, the positive electrode film may also comprise an optional conductive agent. The type of the conductive agent is not specifically limited, and may be chosen by those skilled in the art according to actual needs.

As an example, the conductive agent used for the positive electrode film may comprise one or more of graphite, superconducting carbon, acetylene black, carbon black, Ketjen black, carbon dots, carbon nanotubes, graphene, and carbon nanofibers.

[Negative Electrode Plate]

The negative electrode plate comprises a negative electrode current collector and a negative electrode film disposed on at least one surface of the negative electrode current collector. As an example, the negative electrode current collector has two opposite surfaces in the direction of its thickness, and the negative electrode film is laminated on either or both of the two surfaces of the negative electrode current collector.

The negative electrode current collector can adopt materials with good conductivity and mechanical strength, serving as conducting electricity and collecting current. In some embodiments, the negative electrode current collector may adopt a copper foil.

The negative electrode film comprises a negative active material that comprises a first material and a second material, the first material comprising artificial graphite, and the second material comprising natural graphite. It is found surprisingly that when the resistance R of the negative electrode plate is further controlled within a certain range, the negative electrode plate can have higher energy density and effectively improved active ions transmission performance, so that the secondary battery adopting it can have increased low temperature power performance while having higher energy density. More preferably, the secondary battery can further have lower high-temperature cyclic expansion and higher high-temperature storage performance at the same time.

Still further study by inventors indicates that, when the positive active material of the positive electrode plate comprises one or more of layered lithium transition metal oxides and modified compounds thereof, the resistance R of the negative electrode plate satisfies: 6.0 mΩ≤R≤12.0 mΩ.

When the positive active material comprises one or more of layered lithium transition metal oxides and modified compounds thereof, the negative active material comprises artificial graphite and natural graphite both, and the resistance R of the negative electrode plate satisfies 6.0 mΩ≤R≤12.0 mΩ, an effective coordination can be formed between the positive active material and the negative active material so as to sufficiently utilize the synergistic effect of the advantages thereof, which enables the battery to have a higher energy density, and can also improve the cohesion and adhesion of the negative electrode, reduce the expansion of the negative electrode during the battery cycle, and further improve the solid-phase diffusion capacity of active ions in the negative electrode. Thus it can further improve the transmission performance of active ions between the positive and negative electrodes. In addition, while the negative active material particles are in close contact, a pore network suitable for electrolyte infiltration is also formed, thereby further improving the active ion transport performance. Therefore, the kinetic performance of the battery is significantly improved, the active ions from positive electrode may be accepted quickly by the negative electrode even in a low temperature environment, thereby improving the low temperature power performance of the secondary battery. In addition, the secondary battery is suitable for being charged and discharged at a high rate, and has a significantly reduced probability of lithium precipitation from the negative electrode when it is charged at a high rate, and the secondary battery also has higher safety performance.

Moreover, when the positive active material comprises one or more of layered lithium transition metal oxides and modified compounds thereof, the positive electrode plate can have higher areal density (for example, from 14 mg/cm$^2$ to 20 mg/cm$^2$) and higher compacted density (for example, from 3.3 g/cm$^3$ to 3.5 g/cm$^3$) so as to make the battery have higher energy density.

In these embodiments, preferably, 7.0 mΩ≤R≤11.0 mΩ. More preferably, 8.0 mΩ≤R≤10.0 mΩ. For example, the resistance R of the negative electrode plate can be 8 mΩ, 8.5 mΩ, 9 mΩ, 9.5 mΩ, 9.8 mΩ, 10 mΩ, 10.5 mΩ, 11 mΩ, or 12 mΩ. The resistance R of the negative electrode plate within an appropriate range can further reduce the high-temperature cycle expansion of the battery and improve the low-temperature power performance of the battery.

In these embodiments, preferably, the positive active material comprises one or more of lithium nickel cobalt manganese oxide, lithium nickel cobalt aluminum oxide, and modified compounds thereof. As such, above effects may be achieved well.

Further study by inventors indicates that, when the positive active material comprises one or more of lithium nickel cobalt manganese oxide, lithium nickel cobalt aluminum oxide, and modified compounds thereof, the negative active material comprises artificial graphite and natural graphite both, and the resistance R of the negative electrode plate satisfies 6.0 mΩ≤R≤12.0 mΩ, the performances of the battery can be further improved if the negative active material further satisfies with one or more of following conditions.

In some preferred embodiments, the natural graphite can constitute from 10% to 50% by mass of the negative active material, preferably from 15% to 30% by mass, more preferably from 15% to 25% by mass, especially preferably from 18% to 22% by mass, such as 19%, 20%, and 21% by mass. When the negative active material comprises a proper amount of natural graphite, the negative active material can have higher gram capacity, especially, the adhesion strength between the negative active material particles and the adhesion strength between the negative active material and the negative electrode current collector can be improved so as to enable the negative electrode plate to have higher cohesion and adhesion strength, and reduce the side reactions at the surface of the negative electrode, thereby further reducing the cyclic expansion of the battery. The high temperature cycle performance and safety performance of the battery can also be further improved.

In some preferred embodiments, the powder resistivity of natural graphite under a pressure of 8 MPa can be from 10 Ω·cm to 14 mΩ·cm, preferably from 11 mΩ·cm to 13 mΩ·cm; such as 10.5 mΩ·cm, 11.5 mΩ·cm, 12.0 mΩ·cm, 12.5 mΩ·cm, 13.0 mΩ·cm, 13.5 mΩ·cm, or 13.8 mΩ·cm. The powder resistivity of natural graphite in an appropriate range can further improve the active ion transport performance and electronic conductivity of the negative electrode during the charging and discharging process, thereby improving the power performance, energy density and cycle performance of the battery.

In some preferred embodiments, the powder resistivity of artificial graphite under a pressure of 8 MPa is from 11 mΩ·cm to 16 mΩ·cm, more preferably from 13 mΩ·cm to 15 mΩ·cm; such as 12.0 mΩ·cm, 13.0 mΩ·cm, 13.5 mΩ·cm, 14.0 mΩ·cm, 14.3 mΩ·cm, or 14.6 mΩ·cm. The powder resistivity of artificial graphite in the proper range can further improve the active ion transport performance and electronic conductivity of the negative electrode plate during the charging and discharging process, thereby improving the power performance, energy density and cycle performance of the battery.

In some preferred embodiments, the volume average particle size Dv50 of the negative active material may be from 10 μm to 18 μm, preferably from 11 μm to 15 μm, more preferably from 12 μm to 14 μm. The smaller the Dv50 of the negative active material is, the smaller the powder resistivity is, and the more the resistance of the negative electrode plate can be reduced. And the smaller the Dv50 of the negative active material is, the more the ion migration rate in the negative electrode plate can be increased. The Dv50 of the negative active material is appropriate, so that negative active material has a lower powder resistivity and a higher ion migration rate. At the same time, it can also increase the gram capacity of the negative active material and reduce the side reaction of the electrolyte on the surface of the material, thereby making the battery have higher power performance, cycle performance and energy density at the same time.

The inventors also found that when the positive active material comprises one or more of lithium nickel cobalt manganese oxide, lithium nickel cobalt aluminum oxide and the modified compounds thereof, the negative active material comprises artificial graphite and natural graphite, and the resistance R of the negative electrode plate is within a specific range and the Dv50 of the negative active material is within the above range, the battery can also have a higher capacity retention rate during high-temperature storage, and improve high-temperature storage performance.

In order to make the Dv50 of the negative active material within the range given above, in some embodiments, the volume average particle size Dv50 of natural graphite may be from 10 μm to 16 μm, preferably from 10 μm to 14 μm, more preferably from 11 μm to 13 μm. The volume average particle diameter Dv50 of the artificial graphite may be from 12 μm to 19 μm, preferably from 12 μm to 16 μm, and more preferably from 13 μm to 15 μm.

In some preferred embodiments, the negative active material can have a graphitization degree of from 92% to 96%, preferably from 93% to 95%. When the graphitization degree of the negative active material is within a proper range, it can have a smaller powder resistivity so as to reduce the resistance of the negative electrode plate and have an interlayer spacing suitable for intercalation and deintercalation of ions, thereby further improving the power performance of the battery. Besides, the negative electrode plate adopting the negative active material also has higher cohesion and adhesion strength, thereby further reduce the cyclic expansion of the battery.

It was found by inventors that, when the positive active material comprises one or more of lithium nickel cobalt manganese oxide, lithium nickel cobalt aluminum oxide, and modified compounds thereof, the negative active material comprises artificial graphite and natural graphite, the resistance R of the negative electrode plate is within a certain range, and the graphitization degree of the negative active material is within the above range, the high-temperature storage performance of the battery can be further improved.

In order to make the graphitization degree of the negative active material within the above range, in some embodiments, the graphitization degree of natural graphite can be from 95% to 98.5%, preferably from 96% to 98%, more preferably from 96.5% to 97.6%; the graphitization degree of artificial graphite can be from 90% to 97.5%, preferably from 91% to 95%, more preferably form 92% to 93.5%.

In some preferred embodiments, the areal density of the negative electrode film was from 10 mg/cm$^2$ to 13 mg/cm$^2$, preferably from 10.5 mg/cm$^2$ to 11.5 mg/cm$^2$. When the positive active material comprises one or more of lithium nickel cobalt manganese oxide, lithium nickel cobalt aluminum oxide, and modified compounds thereof, the negative active material comprises artificial graphite and natural graphite, the resistance R of the negative electrode plate is within the specified range, and the areal density of the negative electrode film is within the given range, the battery can obtain a higher energy density and also have better active ions and electrons transmission performance, thereby further improving the kinetic performance of the battery. Besides, when the battery satisfies the above design, the polarization and the side reactions can be reduced, thereby further improving the cycle performance of the battery.

In some preferred embodiments, the compacted density of the negative electrode film is from 1.6 g/cm$^3$ to 1.8 g/cm$^3$, preferably from 1.65 g/cm$^3$ to 1.75 g/cm$^3$, and especially preferably from 1.68 g/cm$^3$ to 1.73 g/cm$^3$. When the positive active material is one or more of lithium nickel cobalt manganese oxide, lithium nickel cobalt aluminum oxide, and modified compounds thereof, the negative active material comprises artificial graphite and natural graphite, the resistance R of the negative electrode plate is within a certain range, and the compacted density of the negative electrode film is within the given range, the battery can be guaranteed to obtain a higher energy density; at the same time, the close contact between the negative active material particles can effectively reduce the resistance of the negative electrode membrane, thereby further improving the power performance of the battery. Besides, a proper compacted density can also maintain the structural integrity of the negative active material particles, which is conducive to improving the cohesion and adhesion power of the negative electrode plate and reducing the expansion and the side reactions during the cycle process of the battery, thereby further increasing the cycle life and safety performance of the battery.

Further study by inventors indicates that, when the positive active material of the positive electrode plate comprises one or more of lithium-containing phosphates with olivine structure and modified compounds thereof, the resistance R of the negative electrode plate satisfies: $3.0\ m\Omega \leq R \leq 7.0\ m\Omega$.

When the positive active material comprises one or more of lithium-containing phosphates with olivine structure and modified compounds thereof, the negative active material comprises artificial graphite and natural graphite both, and the resistance R of the negative electrode plate satisfies $3.0\ m\Omega \leq R \leq 7.0\ m\Omega$, an effective coordination can be formed between the positive active material and the negative active material so as to sufficiently utilize the synergistic effect of the advantages thereof, which enables the battery to have a higher energy density, and can also improve the cohesion and adhesion of the negative electrode, reduce the expansion of the negative electrode during the battery cycle, and further improve the solid-phase diffusion capacity of active ions in the negative electrode, therefore further improving active ions transmission performance between the positive electrode and the negative electrode. Therefore, the kinetic performance of the battery is further improved, the active ions from positive electrode can be accepted quickly by the negative electrode even in a low temperature environment, thereby improving the low-temperature power performance of the secondary battery. Furthermore, the secondary battery is suitable for being charged and discharged at a high rate, and has a significantly reduced probability of lithium precipitation from the negative electrode when it is charged at a high rate.

In these embodiments, preferably, 4.0 m$\Omega \leq R \leq 6.0$ m$\Omega$, for example, R is 4.2 m$\Omega$, 4.5 m$\Omega$, 4.6 m$\Omega$, 4.7 m$\Omega$, 4.8 m$\Omega$, 5.0 m$\Omega$, 5.3 m$\Omega$, 5.5 m$\Omega$. The resistance R of the negative electrode plate within an appropriate range can further improve the low-temperature power performance and high-temperature cycle performance of the battery.

In these embodiments, preferably, the positive active material comprises one or more of lithium iron phosphate, a composite of lithium iron phosphate with carbon, and modified compounds thereof. As such, above effects may be achieved well.

It was further found by inventors that, when the positive active material comprises one or more of lithium iron phosphate, a composite of lithium iron phosphate with carbon, and modified compounds thereof, the negative active material comprises artificial graphite and natural graphite both, and the negative electrode plate has a resistance R satisfying 3.0 m$\Omega \leq R \leq 7.0$ m$\Omega$, the performances of the battery can be further improved if the negative active material further satisfies with one or more of following conditions.

In some preferred embodiments, the natural graphite can constitute from 10% to 50% by mass of the negative active material, preferably from 15% to 50% by mass, more preferably from 35% to 50% by mass, for example, 20%, 30%, 35%, 40%, 42%, 45%, 48% or 50% by mass. When the negative active material comprises a proper amount of natural graphite, the film resistance of the negative electrode plate can be reduced, thereby improving the internal resistance of the battery core. At the same time, the ion transport performance and energy density of the negative electrode plate are further improved.

Therefore, the battery can simultaneously have higher low-temperature power performance, energy density, and high-temperature cycle performance.

In some preferred embodiments, the powder resistivity of natural graphite under a pressure of 8 MPa may be from 8 m$\Omega \cdot$cm to 12 m$\Omega \cdot$cm, preferably from 9.0 m$\Omega \cdot$cm to 11 m$\Omega \cdot$cm. The powder resistivity of natural graphite in an appropriate range can further improve the active ion transport performance and electronic conductivity of the negative electrode plate during the charging and discharging process, thereby improving the power performance, energy density and cycle performance of the battery.

In some preferred embodiments, the powder resistivity of artificial graphite under a pressure of 8 MPa may be from 15 m$\Omega \cdot$cm to 20 m$\Omega \cdot$cm, preferably from 16 m$\Omega \cdot$cm to 18 m$\Omega \cdot$cm. The powder resistivity of artificial graphite in an appropriate range can further improve the active ion transport performance and electronic conductivity of the negative electrode plate during the charging and discharging process, thereby improving the power performance, energy density and cycle performance of the battery.

In some preferred embodiments, the volume average particle diameter Dv50 of the negative active material may be from 15 μm to 19 μm, preferably from 16 μm to 18 μm. The Dv50 of the negative active material is appropriate, so that it has a lower powder resistivity and a higher lithium ion migration rate, while also increasing the gram capacity of the negative active material and reducing the side reaction of the electrolyte on the surface of the material, thereby improving the power performance, cycle performance and energy density of the battery.

The inventors also found that when the positive active material comprises one or more of lithium iron phosphate, a composite material of lithium iron phosphate and carbon and the modified compounds thereof, the negative active material comprises both artificial graphite and natural graphite, the resistance R is within a specific range and the Dv50 of the negative active material is within the above range, the battery can also have a higher capacity retention rate during high-temperature storage, and the high-temperature storage performance can be improved.

In order to make the Dv50 of the negative active material within the above-mentioned range, in some embodiments, the volume average particle size Dv50 of the natural graphite may be from 15 μm to 20 μm, preferably from 15 μm to 19 μm, more preferably from 16 μm to 18 μm. The volume average particle diameter Dv50 of the artificial graphite may be from 14 μm to 19 μm, preferably from 14 μm to 18 μm, and more preferably from 15 μm to 17 μm.

In some preferred embodiments, the negative active material has a graphitization degree of from 92% to 95%, preferably from 93% to 94%. When the graphitization degree of the negative active material is within a proper range, it can have a suitable powder resistivity, which is beneficial to making the resistance of the negative electrode plate within the range given in the present application, and at the same time, have an interlayer spacing suitable for intercalation and deintercalation of ions, thereby further improving the power performance of the battery. Besides, the negative electrode plate adopting the negative active material also has higher cohesion and adhesion, the expansion of the battery during the cycle can be reduced, thereby further improving the cycle performance of the battery.

The inventors also found that when the positive active material comprises one or more of lithium iron phosphate, a composite material of lithium iron phosphate and carbon and the modified compounds thereof, the negative active material comprises both artificial graphite and natural graphite, the resistance R is within a specific range and the graphitization degree of the negative active material is within the above range, the high-temperature storage performance of the battery can also be improved.

In order to make the graphitization degree of the negative active material within the above-mentioned range, in some embodiments, the graphitization degree of natural graphite may be from 95% to 98.5%, preferably from 95% to 98%, more preferably from 96% to 97%. The graphitization degree of artificial graphite may be from 89% to 95%, preferably from 90% to 95%, and more preferably from 91% to 93%.

In some preferred embodiments, the areal density of the negative electrode film may be from 7 mg/cm$^2$ to 10 mg/cm$^2$, preferably from 7 mg/cm$^2$ to 8 mg/cm$^2$. When the positive material comprises one or more of lithium iron phosphate, composite material of lithium iron phosphate and carbon and the modified compounds thereof, the negative active material comprises both artificial graphite and natural graphite, and the resistance R of the negative electrode plate is within a specific range and the areal density of the negative electrode film is within the given range, the battery can have a higher energy density. At the same time, the battery also has better active ion and electron transport performance, thereby further improving the power performance of the battery. In addition, when the battery meets the above-mentioned design, polarization and side reactions can be reduced, thereby further improving the cycle performance of the battery.

In some preferred embodiments, the compacted density of the negative electrode film can be from 1.5 g/cm³ to 1.7 g/cm³, preferably from 1.55 g/cm³ to 1.65 g/cm³, more preferably from 1.55 g/cm³ to 1.6 g/cm³. When the positive material comprises one or more of lithium iron phosphate, composite material of lithium iron phosphate and carbon and the modified compounds thereof, the negative active material comprises both artificial graphite and natural graphite, the resistance R of the negative electrode plate is within a specific range and the compacted density of the negative electrode film is within the given range, the battery can be guaranteed to have a higher energy density. At the same time, the close contact between the negative active material particles can effectively reduce the resistance of the negative electrode film, thereby further improving the power performance of the battery. In addition, the proper compacted density can also protect the integrity of the negative active material particle structure, which is beneficial to improving the cohesion and adhesion of the negative electrode plate, reducing the expansion and side reactions during the battery cycle, thereby further improving the cycle life and safety performance of the battery.

In the present application, a negative electrode plate that satisfies the resistance R refers to a negative electrode plate with a negative electrode film on at least one surface of the negative electrode current collector, in particular, a negative electrode plate with a negative electrode film on two opposite surfaces of the negative electrode current collector. One or more of the type of the first material, the type of the second material, the ratio of the first material and the second material, the proportion of natural graphite, the compacted density of the negative electrode film, the type of conductive agent, and the content of the conductive agent can be adjusted to make the resistance R of the negative electrode plate within the required range. The selection of the first material and the second material may independently include, but is not limited to, one or more of their composition, powder resistivity, graphitization degree, particle size distribution, surface coating modification, and the like.

In any negative electrode plate of the present application, optionally, the negative active material may further include one or more of hard carbon, soft carbon, silicon-based materials, and tin-based materials. The silicon-based material may be selected from one or more of elemental silicon, silicon oxide, silicon carbon composite, and silicon alloy. The tin-based material may be selected from one or more of elemental tin, tin oxide compound, and tin alloy.

In any negative electrode plate of the present application, preferably, any two circular regions with the same area on the negative electrode plate are respectively denoted as the first region and the second region, and the distance between the center of the first region and the second region is 20 cm, and the electrode plate resistance $R_1$ of the first region and the electrode plate resistance $R_2$ of the second region satisfy: $|R_1-R_2|\leq 3$. The resistance difference between any two circular areas with the same area and a center distance of 20 cm on the negative electrode plate is small, indicating that the resistance fluctuation of the negative electrode plate is small, that is to say, the uniformity of the dispersion of the first material and the second material in the negative electrode film is better. The compacted density, cycle stability and electrolyte distribution uniformity at each position in the negative electrode plate can be improved, so that the active ion transport performance and electronic conductivity performance at different positions in the negative electrode plate are basically at the same level, so that the capacity, cycle and storage life and kinetic performance at each position of the negative electrode plate are all improved. The overall consistency of the negative electrode plate is good, which can further improve the energy density, high-temperature performance and low-temperature power performance of the secondary battery. Preferably, $|R_1-R_2|\leq 1$.

In some embodiments, the negative electrode film may also include a binder. As an example, the binder used for the negative electrode film can be one or more selected from polyacrylic acid (PAA), sodium polyacrylate (PAAS), polyacrylamide (PAM), polyvinyl alcohol (PVA), styrene butadiene rubber (SBR), sodium alginate (SA), polymethylacrylic acid (PMAA) and carboxymethyl chitosan (CMCS).

In some embodiments, the negative electrode film may optionally include a thickener. As an example, the thickener may be sodium carboxymethyl cellulose (CMC-Na).

In some embodiments, the negative electrode film may optionally include a conductive agent. As an example, the conductive agent for the negative electrode film may be one or more selected from superconducting carbon, acetylene black, carbon black, Ketjen black, carbon dots, carbon nanotubes, graphene, and carbon nanofibers.

In the present application, the resistance R of the negative electrode plate has a well-known meaning in the art, and can be tested by a method known in the art. For example, a BER1300 multi-function electrode plate resistance tester is used for the test. First, the negative electrode plate is cut into a test sample of a certain size; the resistance meter, the pressure display power supply and the computer are is turn on, the air valve is open, and the upper and lower copper probes is cleaned with dust-free paper soaked in alcohol. The computer software is clicked to open, the port, pressure and test mode are selected, then the test area of the terminal 154.02 mm² is entered, the test electrode plate is placed between the two probes, and the run button on the software is clicked to start the test. The test results are recorded after the test. In order to ensure the accuracy of the test results, 5 groups of samples to be tested can be taken at the same time, and the average value of these 5 groups of samples to be tested can be calculated.

Referring to the test method of the resistance R, the respective resistances $R_1$ and $R_2$ of any two circular regions with the same area and 20 cm center distance on the negative electrode plate is tested, and the resistance difference $|R_1-R_2|$ is calculated.

The powder resistivity of natural graphite and artificial graphite under a pressure of 8 MPa has a meaning known in the art, and can be tested by a method known in the art. For example, the PRCD1100 powder resistivity meter can be used for testing, referring to the national standard GB/T30835-2014.

The areal density of the negative electrode film has the meaning known in the art, and can be measured by methods known in the art. For example, take the negative electrode plate subjected to a single-side coating and cold pressing (if the electrode plate is subjected to a double-side coating, one side of the negative electrode film can be wiped off firstly), cut it into small disks with an area of $S_1$, and get the weight recorded as $M^1$. Then the negative electrode film of the weighed negative electrode plate is wiped off and the negative electrode current collector is weighed and recorded as $M_0$. The areal density of the negative electrode film is determined as (weight of negative electrode plate $M_1$-weight of negative electrode current collector $M_0$)/$S_1$.

The compacted density of the negative electrode film has the meaning known in the art, and can be measured by methods known in the art. For example, take the negative electrode plate subjected to a single-side coating and cold pressing (if the electrode plate is subjected to a double-side coating, one side of the negative electrode film can be wiped off firstly), measure the thickness of the negative electrode film and determine the areal density of the negative electrode film according to the above measuring method. The compacted density of the negative electrode film=the areal density of the negative electrode film/the thickness of the negative electrode film.

$D_v50$ of the negative active material has the meaning known in the art, and can be measured by methods known in the art. For example, $D_v50$ can be measured by a laser particle size analyzer (such as Malvern Master Size 3000) with reference to GB/T 19077.1-2016. Physical definition of $D_v50$ is the particle size at which the material reaches 50% of cumulative volume distribution percentage.

The graphitization degree has the meaning known in the art, and can be measured by methods known in the art. For example, it can be measured by an X-ray diffractometer (such as Bruker D8 Discover). $d_{002}$ can be measured with reference to JIS K 0131-1996 and JB/T 4220-2011, and then the graphitization degree is calculated according to the formula of $G=(0.344-d_{002})/(0.344-0.3354)\times100\%$, where $d_{002}$ is an interlayer spacing in nanometer in the crystal structure of graphite. In the X-ray diffractometer analysis, $CuK_\alpha$ ray is used as radiation source, a ray wavelength $\lambda$ is 1.5418 Å, a scanning angle $2\theta$ is from 20° to 80° and a scanning rate is 4°/min.

[Electrolyte]

Electrolytes act as conducting ions between the positive electrode plate and the negative electrode plate. This application has no specific restrictions on the type of electrolyte, which can be selected according to requirements. For example, electrolytes can be at least one selected from a solid electrolyte and a liquid electrolyte, i.e. electrolytic solution.

In some embodiments, the electrolytic solution is used as an electrolyte. The electrolytic solution includes electrolyte salts and solvents.

In some embodiments, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium difluorosulfimide), LiTFSI (lithium bistrifluoromethanesulfonimide), LiTFS (lithium trifluoromethanesulfonate), LiDFOB (lithium difluorooxalate), LiBOB (lithium bisoxalate), $LiPO_2F_2$ (lithium difluorophosphate), LiDFOP (lithium difluorobisoxalate phosphate), and LiTFOP (lithium tetrafluorooxalate phosphate).

In some embodiments, the organic solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

In some embodiments, the electrolytic solution may further optionally include additives. For example, the additives may include negative electrode film-forming additives, positive electrode film-forming additives, and additives that can improve some performances of the battery, such as additives that improve overcharge performance of the battery, additives that improve high temperature performance of the battery, and additives that improve low temperature performance of the battery.

[Separator]

Secondary batteries using an electrolytic solution, as well as some secondary batteries using solid electrolytes, also include a separator. The separator is arranged between the positive electrode plate and the negative electrode plate, which acts as isolation. This application has no special restrictions on the type of separators, and any well-known porous structure separator with good chemical and mechanical stability can be selected. In some embodiments, the material of the separator may be selected from one or more of glass fiber, non-woven fabric, polyethylene, polypropylene, and polyvinylidene fluoride. The separator may be a single-layer film or a multilayer composite film. When the separator is a multilayer composite film, the materials of each layer may be the same or different.

The present application does not have particular limitation to the shape of the secondary battery. The secondary battery may be cylindrical, square, or in other arbitrary shape. FIG. 1 shows a secondary battery 5 with a square structure as an example.

In some embodiments, the secondary battery may include an outer package for packaging the positive electrode plate, the negative electrode plate, and the electrolyte.

In some embodiments, the outer package of the secondary battery may be a soft bag, such as a pocket type soft bag. The material of the soft bag may be plastic, for example, it may include one or more of polypropylene (PP), polybutylene terephthalate (PBT), polybutylene succinate (PBS), and the like. The outer package of the secondary battery may also be a hard case, such as a hard plastic case, an aluminum case, a steel case, and the like.

Figure 2:
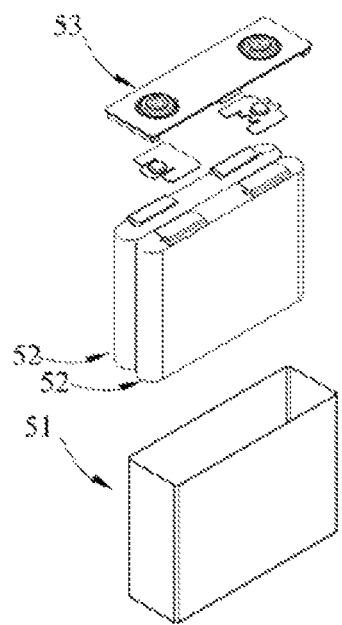
FIG. 2 is an exploded view of FIG. 1.

In some embodiments, referring to FIG. 2, the outer package may include a shell 51 and a cover plate 53. The shell 51 may include a bottom plate and side plates connected to the bottom plate, and the bottom plate and the side plates enclose a receiving cavity. The shell 51 has an opening communicated with the receiving cavity, and the cover plate 53 can cover the opening to close the receiving cavity.

The positive electrode plate, the negative electrode plate, and the separator may form an electrode assembly 52 by winding or stacking. The electrode assembly 52 is packaged in the receiving cavity. The electrolyte may adopt an electrolytic solution, and the electrolytic solution infiltrates the electrode assembly 52. The secondary battery 5 includes one or more electrode assemblies 52, which can be adjusted according to requirements.

In some embodiments, the secondary batteries may be assembled into a battery module, the battery module may include a plurality of secondary batteries, and the specific number can be adjusted according to the application and capacity of the battery module.

Figure 3:
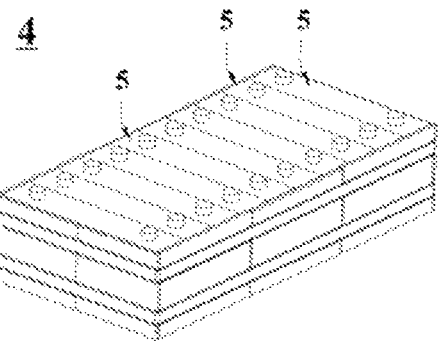
FIG. 3 is a schematic diagram of an embodiment of a battery module.

FIG. 3 shows a battery module 4 as an example. Referring to FIG. 3, in the battery module 4, a plurality of secondary batteries 5 may be arranged sequentially in a length direction of the battery module 4. Of course, they may also be arranged in any other way. Further, a plurality of secondary batteries 5 may be fixed by fasteners.

Optionally, the battery module 4 may further include a housing having a receiving space, and a plurality of secondary batteries 5 are received in the receiving space.

In some embodiments, the above-mentioned battery module may also be assembled into a battery pack, and the number of battery modules included in the battery pack can be adjusted according to the application and capacity of the battery pack.

Figure 4:
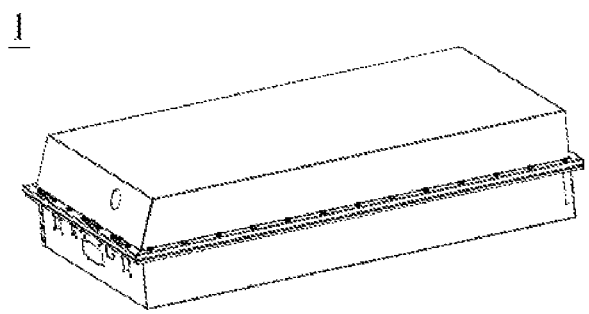
FIG. 4 is a schematic diagram of an embodiment of a battery pack.
Figure 5:
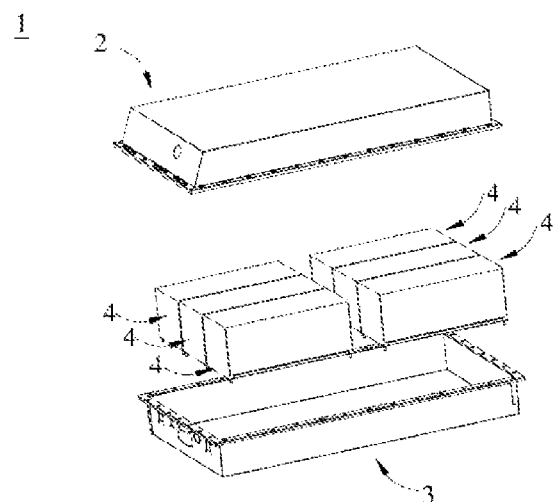
FIG. 5 is an exploded view of FIG. 4.

FIGS. 4 and 5 show a battery pack 1 as an example. Referring to FIGS. 4 and 5, the battery pack 1 may include a battery case and a plurality of battery modules 4 disposed in the battery case. The battery case includes an upper case body 2 and a lower case body 3. The upper case body 2 can cover the lower case body 3 to form a closed space for receiving the battery modules 4. A plurality of battery modules 4 can be arranged in the battery case in any manner.

Further study by inventors indicates that, coordinately regulating the negative electrode plate in combination with the positive active material adopted in the battery can enable the secondary battery to have better performance.

[Preparation]

The preparation method of the secondary battery may include the step of assembling the negative electrode plate, the positive electrode plate and the electrolyte into a secondary battery. In some embodiments, the positive electrode plate, the separator and the negative electrode plate are wound or stacked in order in which the separator is disposed between the positive electrode plate and the negative electrode plate to serve as an isolation, thereby obtaining an electrode assembly, i.e. a battery core; and the battery electrode assembly is placed in an outer package, injected with the electrolytic solution, and sealed to prepare the secondary battery.

In some embodiments, the preparation of secondary battery may also include the steps of preparing a positive electrode plate. As an example, the positive electrode plate can be obtained by dispersing a positive active material, a conductive agent and a binder into a solvent (for example, N-methylpyrrolidone, abbreviated as NMP) to form a uniform positive electrode slurry; the positive electrode slurry is coated on the positive electrode current collector followed by drying and cold pressing, thereby obtaining the positive electrode plate.

In some embodiments, the preparation of secondary battery may also include the step of preparing a negative electrode plate. As an example, the negative electrode plate can be obtained by dispersing a negative active material, a binder, an optional thickener and an optional conductive agent into a solvent in which the solvent is deionized water to form a uniform negative electrode slurry; the negative electrode slurry is coated on the negative electrode current collector followed by drying and cold pressing, thereby obtaining the negative electrode plate.

[Apparatus]

The second aspect of the present application provides an apparatus, the apparatus including the secondary battery according to the first aspect of the present application. The secondary battery can be used as a power source of the apparatus, and as an energy storage unit of the apparatus. The apparatus may be, but not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

The apparatus may select the secondary battery, the battery module, or the battery pack according to its usage requirements.

Figure 6:
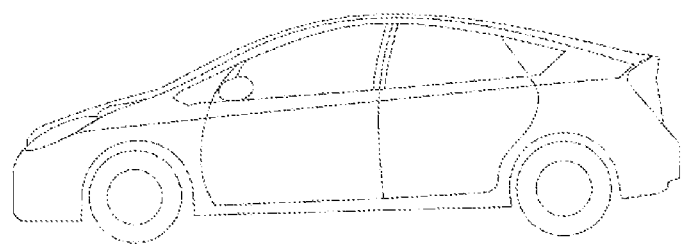
FIG. 6 is a schematic diagram of an embodiment of an apparatus using the secondary battery as a power source.

FIG. 6 shows an apparatus as an example. The apparatus is a pure electric vehicle, a hybrid electric vehicle, or a plug-in hybrid electric vehicle. In order to meet the requirements of the apparatus for high power and high energy density of the secondary battery, a battery pack or a battery module may be used.

As another example, the apparatus may be a mobile phone, a tablet computer, a notebook computer, and the like. The apparatus is generally required to be thin and light, and the secondary battery can be used as a power source.

Exemplary Embodiments

Embodiment 1. A secondary battery, comprising a positive electrode plate and a negative electrode plate, the positive electrode plate comprising a positive electrode current collector and a positive electrode film that is disposed on at least one surface of the positive electrode current collector and comprises a positive active material, the negative electrode plate comprising a negative electrode current collector and a negative electrode film that is disposed on at least one surface of the negative electrode current collector and comprises a negative active material, wherein the positive active material comprises one or more of layered lithium transition metal oxides and modified compounds thereof, the negative active material comprises a first material and a second material, the first material comprises artificial graphite, the second material comprises natural graphite, and the negative electrode plate has a resistance R satisfying 6.0 m$\Omega$≤R≤12.0 m$\Omega$, 8.0 m$\Omega$≤R≤10.0 m$\Omega$.

Embodiment 2. The secondary battery according to embodiment 1, wherein the natural graphite constitutes from 10% to 50% by mass of the negative active material, preferably from 15% to 30% by mass.

Embodiment 3. The secondary battery according to embodiment 1 or 2, wherein the natural graphite has a powder resistivity of from 10.0 m$\Omega$·cm to 14.0 m$\Omega$·cm under a pressure of from 8 MPa, preferably from 11.0 m$\Omega$·cm to 13.0 m$\Omega$·cm; and/or, the artificial graphite has a powder resistivity of from 11.0 m$\Omega$·cm to 16.0 m$\Omega$·cm under a pressure of 8 MPa, preferably from 13.0 m$\Omega$·cm to 15.0 m$\Omega$·cm.

Embodiment 4. The secondary battery according to any one of embodiments 1-3, wherein the negative active material has a volume average particle diameter Dv50 of from 11 µm to 15 µm, preferably from 12 µm to 14 µm.

Embodiment 5. The secondary battery according to any one of embodiments 1-4, wherein the negative active material has a graphitization degree of from 92% to 96%, preferably from 93% to 95%.

Embodiment 6. The secondary battery according to any one of embodiments 1-5, wherein the negative electrode film has an areal density of from 10 mg/cm$^2$ to 13 mg/cm$^2$, preferably from 10.5 mg/cm$^2$ to 11.5 mg/cm$^2$; and/or the negative electrode film has a compacted density of from 1.6 g/cm$^3$ to 1.8 g/cm$^3$, preferably from 1.65 g/cm$^3$ to 1.75 g/cm$^3$.

Embodiment 7. The secondary battery according to any one of embodiments 1-6, wherein the layered lithium transition metal oxide comprises one or more of lithium nickel cobalt manganese oxide, lithium nickel cobalt aluminum oxide and modified compounds thereof.

Embodiment 8. A secondary battery, comprising a positive electrode plate and a negative electrode plate, the positive electrode plate comprising a positive electrode current collector and a positive electrode film that is disposed on at least one surface of the positive electrode current collector and comprises a positive active material, the negative electrode plate comprising a negative electrode current collector and a negative electrode film that is disposed on at least one surface of the negative electrode current collector and comprises a negative active material, wherein the positive active material comprises one or more of lithium-containing phosphates with olivine structure and modified compounds thereof, the negative active material comprises a first material and a second material, the first material comprising artificial graphite, the second material comprising natural graphite, and the negative electrode plate has a resistance R satisfying 3.0 m$\Omega$≤R≤7.0 m$\Omega$, 4.0 m$\Omega$≤R≤6.0 m$\Omega$.

Embodiment 9. The secondary battery according to embodiment 8, wherein the natural graphite constitutes from 10% to 50% by mass of the negative active material, preferably from 35% to 50% by mass.

Embodiment 10. The secondary battery according to embodiment 8 or 9, wherein the natural graphite has a powder resistivity of from 8.0 m$\Omega$·cm to 12.0 m$\Omega$·cm under a pressure of from 8 MPa, preferably from 9.0 m$\Omega$·cm to 11.0 m$\Omega$·cm; and/or, the artificial graphite has a powder resistivity of from 15 m$\Omega$·cm to 20 m$\Omega$·cm under a pressure of 8 MPa, preferably from 16 m$\Omega$·cm to 18 m$\Omega$·cm.

Embodiment 11. The secondary battery according to any one of embodiments 8-10, wherein the negative active material has a volume average particle diameter Dv50 of from 15 μm to 19 μm, preferably from 16 μm to 18 μm.

Embodiment 12. The secondary battery according to any one of embodiments 8-11, wherein the negative active material has a graphitization degree of from 92% to 95%, preferably from 93% to 94%.

Embodiment 13. The secondary battery according to any one of embodiments 8-12, wherein the negative electrode film has an areal density of from 7 mg/cm$^2$ to 10 mg/cm$^2$, preferably from 7 mg/cm$^2$ to 8 mg/cm$^2$; and/or the negative electrode film has a compacted density of from 1.5 g/cm$^3$ to 1.7 g/cm$^3$, preferably from 1.55 g/cm$^3$ to 1.65 g/cm$^3$.

Embodiment 14. The secondary battery according to any one of embodiments 8-13, wherein the lithium-containing phosphate with olivine structure comprises one or more of lithium iron phosphate, a composite material of lithium iron phosphate and carbon.

Embodiment 15. The secondary battery according to any one of embodiments 1-14, wherein any two circular regions with the same area on the negative electrode plate are respectively denoted as the first region and the second region, and the distance between the center of the first region and the second region is 20 cm, and the electrode plate resistance $R_1$ of the first region and the electrode plate resistance $R_2$ of the second region satisfy: $|R_1-R_2|$≤3; preferably $|R_1-R_2|$≤1

Embodiment 16. An apparatus, comprising the secondary battery according to any one of embodiments 1-15.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Example 1

Negative Electrode Plate

A negative active material (75 wt % of artificial graphite and 25 wt % of natural graphite), a conductive agent Super P, a binder SBR, a thickener CMC-Na at a mass ratio of 96.2:0.8:1.8:1.2 in an appropriate amount of deionized water to form a uniform negative electrode slurry; and both surfaces of a copper foil as a negative electrode current collector were coated with the negative electrode slurry, thereby obtaining a negative electrode plate after steps of drying, cold pressing and the like.

Positive Electrode Plate

A positive active material LiNi$_{0.8}$Co$_{0.1}$Mn$_{0.1}$O$_2$ (abbreviated as NCM 811), a conductive agent Super P and a binder PVDF at a mass ratio of 96.5:1.5:2 were dispersed in an appropriate amount of NMP with stirring to form a uniform positive electrode slurry, and then both surfaces of an aluminum foil as a positive electrode current collector were coated with the positive electrode slurry, thereby obtaining a positive electrode plate after steps of drying, cold pressing and the like.

Separator

Use a PE/PP composite film as the separator.

Preparation of an Electrolytic Solution

Ethylene carbonate (EC), ethyl methyl carbonate (EMC), and diethyl carbonate (DEC) at a volume ratio of 1:1:1 were mixed, and then LiPF$_6$ was dissolved uniformly in the solution to obtain an electrolytic solution, wherein LiPF$_6$ had a concentration of 1 mol/L.

Preparation of a Secondary Battery

The positive electrode plate, the separator and the negative electrode plate were stacked in order and wound into an electrode assembly which was then put into an outer package, in which the electrolytic solution as prepared above was injected, and the secondary battery is obtained after sealing, standing, formation and aging.

Examples 2-25 and Comparative Examples 1-12

The preparation method was similar to that of Example 1 with the exception that the parameters for the preparation process of the negative electrode plate were adjusted so as to obtain the corresponding secondary battery, as shown in Table 1 and Table 2, and that the positive active material used in batteries of Examples 1-12 (Ex. 1-12) and Comparative Examples 1-6 (CE. 1-6) shown in Table 1 was NCM811, and the positive active material used in batteries of Examples 13-25 (Ex. 13-25) and Comparative Examples 7-12 (CE. 7-12) shown in Table 2 was lithium iron phosphate (abbreviated as LFP).

Test Section

For the following tests, the discharge cut-off voltage was 2.8V and the charge cut-off voltage was 4.2V when the positive active material was lithium nickel cobalt manganese oxide; the discharge cut-off voltage was 2.5V and the charge cut-off voltage was 3.65V when the positive active material was lithium iron phosphate.

1) Testing of High-Temperature Cyclic Expansion of Negative Electrode Plate

An initial thickness of the negative electrode plate was recorded as H$_0$. In an environment of 25° C., the charging and discharging test of the battery was carried out as follows: the battery was discharged at a constant current of 1.0 C (i.e. the current value at which the theoretical capacity was completely discharged within 1 hour) to the discharge cut-off voltage; then the battery was charged at a constant current of 1.0 C to the charge cut-off voltage, and then charged at a constant voltage to a current of 0.05 C. At this time, the battery was fully charged, that was with 100% SOC (State of Charge). After the fully charged battery was kept standing for 5 minutes, the battery was discharged at a constant current of 1.0 C to the discharge cut-off voltage. At this time, the discharge capacity was the actual capacity of the battery at 1.0 C, which was recorded as $C_0$. At a temperature of 45° C., the secondary battery was subjected to 100% DOD (100% Depth of Discharge, i.e. being fully charged and then fully discharged) charging and discharging cycle at a rate of 1 $C_0$/1 $C_0$ and through a Neware charging and discharging machine. When the cycle number reached 600, the cycle test was stopped. Having been charged to 100% SOC, the secondary battery was disassembled so as to measure the corresponding thickness of the negative electrode plate, which was recorded as $H_1$. After the battery was cycled for 600 times at a rate of 1 $C_0$/1 $C_0$ and a temperature of 45° C., the expansion rate of the negative electrode plate was $(H_1/H_0-1)\times100\%$.

2) Testing of Low Temperature Lithium Precipitation Performance of Battery

Firstly, the actual capacity $C_0$ of the battery at 1.0 C was measured according to the method shown in testing 1). Then the battery was placed in an environment of −10° C., charged at a constant current of x $C_0$ to the charge cut-off voltage, and then charged at a constant voltage to a current of 0.05 $C_0$ and kept standing for 5 minutes; afterwards the battery core was disassembled to observe the lithium precipitation at the interface. If there was no lithium precipitation on the surface of the negative electrode plate, the charging rate would be increased for testing again until there was lithium precipitation on the surface of the negative electrode plate. The maximum charging rate when there was no lithium precipitation on the surface of the negative electrode plate was recorded to determine the rate of low temperature lithium precipitation.

3) Testing of High Temperature Storage Performance of Battery

Firstly, the actual capacity $C_0$ of the battery at 1.0 C was measured according to the method shown in testing 1). Then the battery at a temperature of 25° C. was charged at a constant current of 1.0 $C_0$ to the charge cut-off voltage, and then charged at a constant voltage to a current of 0.05 C; at this time, the battery was fully charged; the fully charged battery was placed in an environment at 60° C. and taken out after 30 days, and the remaining capacity $C_1$ at 25° C. was tested. This is a storage period, and the discharge capacity at this time was the discharge capacity after the first storage. The first storage test process was repeated until the discharge capacity reached 90% of $C_0$, and the storage time at this time was recorded.

TABLE 1

| | | First material | | | | | Second material | | | |
|---|---|---|---|---|---|---|---|---|---|---|
| | Type | Mass % | Powder resistivity mΩ·cm | $D_v50$ μm | Graphitization degree % | Type | Mass % | Powder resistivity mΩ·cm | $D_v50$ μm | Graphitization degree % |
| Ex. 1 | artificial graphite | 75 | 11.20 | 18.2 | 97.2 | natural graphite | 25 | 10.10 | 15.5 | 98.1 |
| Ex. 2 | artificial graphite | 75 | 12.40 | 16.3 | 94.4 | natural graphite | 25 | 11.30 | 13.2 | 97.7 |
| Ex. 3 | artificial graphite | 75 | 13.60 | 15.5 | 93.2 | natural graphite | 25 | 12.50 | 12.5 | 97.2 |
| Ex. 4 | artificial graphite | 75 | 14.30 | 14.6 | 92.7 | natural graphite | 25 | 13.20 | 11.6 | 97.1 |
| Ex. 5 | artificial graphite | 75 | 15.90 | 12.4 | 90.2 | natural graphite | 25 | 13.90 | 10.5 | 96.5 |
| Ex. 6 | artificial graphite | 90 | 14.60 | 13.7 | 93.1 | natural graphite | 10 | 13.50 | 11.3 | 97.6 |
| Ex. 7 | artificial graphite | 80 | 14.60 | 13.7 | 93.1 | natural graphite | 20 | 13.50 | 11.3 | 97.6 |
| Ex. 8 | artificial graphite | 70 | 14.60 | 13.7 | 93.1 | natural graphite | 30 | 13.50 | 11.3 | 97.6 |
| Ex. 9 | artificial graphite | 75 | 14.60 | 13.7 | 93.1 | natural graphite | 25 | 13.50 | 11.3 | 97.6 |
| Ex. 10 | artificial graphite | 75 | 14.60 | 13.7 | 93.1 | natural graphite | 25 | 13.50 | 11.3 | 97.6 |
| Ex. 11 | artificial graphite | 75 | 14.60 | 13.7 | 93.1 | natural graphite | 25 | 13.50 | 11.3 | 97.6 |
| Ex. 12 | artificial graphite | 75 | 14.60 | 13.7 | 93.1 | natural graphite | 25 | 13.50 | 11.3 | 97.6 |
| CE. 1 | artificial graphite | 75 | 14.60 | 13.7 | 93.1 | natural graphite | 25 | 13.50 | 11.3 | 97.6 |
| CE. 2 | artificial graphite | 75 | 14.60 | 13.7 | 93.1 | natural graphite | 25 | 13.50 | 11.3 | 97.6 |
| CE. 3 | artificial graphite | 75 | 10.30 | 13.8 | 97.5 | natural graphite | 25 | 13.50 | 11.3 | 97.6 |
| CE. 4 | artificial graphite | 75 | 17.20 | 13.8 | 88.3 | natural graphite | 25 | 13.50 | 11.3 | 97.6 |
| CE. 5 | artificial graphite | 75 | 15.80 | 12.0 | 90.5 | natural graphite | 25 | 13.90 | 10.0 | 96.1 |
| CE. 6 | artificial graphite | 75 | 11.10 | 16.0 | 94.1 | natural graphite | 25 | 10.20 | 13.8 | 98.6 |

TABLE 1-continued

|   | Negative electrode film | | Negative electrode plate Resistance R | High-temp. cyclic expansion rate of negative electrode plate % | Low-temp. Li precipitation rate of negative electrode plate | High-temp. storage life of battery/day |
|---|---|---|---|---|---|---|
|   | Compacted density g/cm³ | Areal density mg/cm² | | | | |
| Ex. 1 | 1.7 | 11.0 | 6.3 | 43 | 0.38$C_0$ | 275 |
| Ex. 2 | | | 7.2 | 41 | 0.41$C_0$ | 297 |
| Ex. 3 | | | 8.7 | 37 | 0.45$C_0$ | 327 |
| Ex. 4 | | | 9.6 | 35 | 0.66$C_0$ | 352 |
| Ex. 5 | | | 11.8 | 43 | 0.40$C_0$ | 290 |
| Ex. 6 | | | 11.5 | 42 | 0.33$C_0$ | 306 |
| Ex. 7 | | | 9.8 | 32 | 0.57$C_0$ | 338 |
| Ex. 8 | | | 8.3 | 38 | 0.50$C_0$ | 316 |
| Ex. 9 | 1.6 | 11.0 | 11.2 | 33 | 0.70$C_0$ | 346 |
| Ex. 10 | 1.8 | 11.0 | 5.4 | 39 | 0.33$C_0$ | 300 |
| Ex. 11 | 1.7 | 10.0 | 9.1 | 35 | 0.56$C_0$ | 323 |
| Ex. 12 | 1.7 | 13.0 | 10.3 | 38 | 0.49$C_0$ | 308 |
| CE. 1 | 1.5 | 8.0 | 12.5 | 47 | 0.30$C_0$ | 225 |
| CE. 2 | 1.9 | 14.0 | 5.8 | 51 | 0.12$C_0$ | 187 |
| CE. 3 | 1.7 | 11.0 | 5.9 | 50 | 0.18$C_0$ | 239 |
| CE. 4 | 1.7 | 11.0 | 12.2 | 45 | 0.30$C_0$ | 205 |
| CE. 5 | 1.6 | 13.0 | 12.6 | 46 | 0.28$C_0$ | 209 |
| CE. 6 | 1.8 | 10.0 | 5.2 | 52 | 0.14$C_0$ | 224 |

TABLE 2

|   | First material | | | | | Second material | | | | |
|---|---|---|---|---|---|---|---|---|---|---|
|   | Type | Mass % | Powder resistivity mΩ·cm | $D_v50$ μm | Graphitization degree % | Type | Mass % | Powder resistivity mΩ·cm | $D_v50$ μm | Graphitization degree % |
| Ex. 13 | artificial graphite | 55 | 15.20 | 18.6 | 90.8 | natural graphite | 45 | 8.30 | 19.4 | 98.5 |
| Ex. 14 | artificial graphite | 55 | 16.30 | 17.3 | 90.1 | natural graphite | 45 | 9.50 | 18.3 | 98.3 |
| Ex. 15 | artificial graphite | 55 | 17.50 | 16.6 | 89.8 | natural graphite | 45 | 10.20 | 17.5 | 98.2 |
| Ex. 16 | artificial graphite | 55 | 18.60 | 15.3 | 89.6 | natural graphite | 45 | 11.00 | 17.0 | 98.0 |
| Ex. 17 | artificial graphite | 55 | 19.70 | 16.0 | 89.2 | natural graphite | 45 | 11.90 | 16.1 | 98.1 |
| Ex. 18 | artificial graphite | 80 | 18.20 | 15.6 | 89.9 | natural graphite | 20 | 10.30 | 17.3 | 98.2 |
| Ex. 19 | artificial graphite | 70 | 18.20 | 15.6 | 89.9 | natural graphite | 30 | 10.30 | 17.3 | 98.2 |
| Ex. 20 | artificial graphite | 60 | 18.20 | 15.6 | 89.9 | natural graphite | 40 | 10.30 | 17.3 | 98.2 |
| Ex. 21 | artificial graphite | 50 | 18.20 | 15.6 | 89.9 | natural graphite | 50 | 10.30 | 17.3 | 98.2 |
| Ex. 22 | artificial graphite | 55 | 18.20 | 15.6 | 89.9 | natural graphite | 45 | 10.30 | 17.3 | 98.2 |
| Ex. 23 | artificial graphite | 55 | 18.20 | 15.6 | 89.9 | natural graphite | 45 | 10.30 | 17.3 | 98.2 |
| Ex. 24 | artificial graphite | 55 | 18.20 | 15.6 | 89.8 | natural graphite | 45 | 10.30 | 17.3 | 98.2 |
| Ex. 25 | artificial graphite | 55 | 18.20 | 15.6 | 89.8 | natural graphite | 45 | 10.30 | 17.3 | 98.2 |
| CE. 7 | artificial graphite | 55 | 18.20 | 15.6 | 89.8 | natural graphite | 45 | 10.30 | 17.3 | 98.2 |
| CE. 8 | artificial graphite | 55 | 18.20 | 15.6 | 89.8 | natural graphite | 45 | 10.30 | 17.3 | 98.2 |
| CE. 9 | artificial graphite | 55 | 14.20 | 15.8 | 95.3 | natural graphite | 45 | 8.50 | 17.5 | 98.2 |
| CE. 10 | artificial graphite | 55 | 21.80 | 15.8 | 87.5 | natural graphite | 45 | 11.40 | 17.5 | 98.2 |
| CE. 11 | artificial graphite | 55 | 20.00 | 15.1 | 89.0 | natural graphite | 45 | 11.30 | 15.5 | 95.9 |
| CE. 12 | artificial graphite | 55 | 15.20 | 19.0 | 94.1 | natural graphite | 45 | 8.50 | 19.3 | 98.6 |

TABLE 2-continued

|  | Negative electrode film | | Negative electrode plate Resistance R | High-temp. cyclic expansion rate of negative electrode plate % | Low-temp. lithium precipitation rate of negative electrode plate | High-temp. storage life of battery/day |
|---|---|---|---|---|---|---|
|  | Compacted density g/cm$^3$ | Areal density mg/cm$^2$ | | | | |
| Ex. 13 | 1.6 | 7.5 | 3.2 | 50 | 0.40$C_0$ | 317 |
| Ex. 14 |  |  | 4.5 | 49 | 0.46$C_0$ | 334 |
| Ex. 15 |  |  | 5.3 | 48 | 0.66$C_0$ | 357 |
| Ex. 16 |  |  | 6.0 | 49 | 0.76$C_0$ | 398 |
| Ex. 17 |  |  | 6.9 | 50 | 0.56$C_0$ | 329 |
| Ex. 18 |  |  | 6.7 | 45 | 0.47$C_0$ | 376 |
| Ex. 19 |  |  | 6.0 | 43 | 0.53$C_0$ | 367 |
| Ex. 20 |  |  | 5.2 | 46 | 0.60$C_0$ | 371 |
| Ex. 21 |  |  | 4.6 | 45 | 0.78$C_0$ | 395 |
| Ex. 22 | 1.5 | 7.5 | 6.8 | 47 | 0.73$C_0$ | 355 |
| Ex. 23 | 1.7 | 7.5 | 3.6 | 50 | 0.41$C_0$ | 321 |
| Ex. 24 | 1.6 | 7.0 | 4.8 | 45 | 0.66$C_0$ | 356 |
| Ex. 25 | 1.6 | 10.0 | 5.5 | 48 | 0.47$C_0$ | 344 |
| CE. 7 | 1.4 | 6.0 | 7.8 | 53 | 0.30$C_0$ | 301 |
| CE. 8 | 1.8 | 11.0 | 2.9 | 58 | 0.13$C_0$ | 195 |
| CE. 9 | 1.6 | 7.5 | 2.6 | 60 | 0.24$C_0$ | 303 |
| CE. 10 | 1.6 | 7.5 | 7.2 | 53 | 0.31$C_0$ | 286 |
| CE. 11 | 1.5 | 10.0 | 7.5 | 47 | 0.24$C_0$ | 305 |
| CE. 12 | 1.7 | 7.0 | 2.8 | 57 | 0.13$C_0$ | 314 |

It could be seen from the results of comparison between Examples 1-12 and Comparative Examples 1-6, when the positive electrode plate comprised one or more of layered lithium transition metal oxides and modified compounds thereof, the negative electrode plate comprised both artificial graphite and natural graphite, and the resistance R of the negative electrode plate satisfied 6.0 mΩ≤R≤12.0 mΩ, especially satisfied 8.0 mΩ≤R≤10.0 mΩ, the negative electrode plate could have lower cyclic expansion during the charging and discharging process and the negative electrode plate could also have effectively increased lithium ions transmission performance, thereby improving the low-temperature cyclic expansion performance and the low-temperature power performance of the secondary battery while having higher energy density. Moreover, the capacity retention rate of the battery during the high-temperature storage process was also significantly increased.

It could be seen from the results of comparison between Examples 13-25 and Comparative Examples 7-12, when the positive electrode plate comprised one or more of lithium containing phosphates with olivine structure and modified compounds thereof, the negative electrode plate comprised both artificial graphite and natural graphite, and the resistance R of the negative electrode plate satisfied 3.0 mΩ≤R≤7.0 mΩ, especially satisfied 4.0 mΩ≤R≤6.0 mΩ, the negative electrode plate could have lower cyclic expansion during the charging and discharging process and the negative electrode plate could also have effectively increased lithium ions transmission performance, thereby reducing the cyclic expansion and improving the low-temperature power performance of the secondary battery while having higher energy density. More preferably, the capacity retention rate of the battery during the high-temperature storage process was also significantly increased.

In addition, it could be seen from the results of Examples 6-8 and Examples 18-21, when the positive electrode plate comprised a certain type of positive active material, the negative electrode plate comprised both artificial graphite and natural graphite, and the mass percentage of natural graphite in the negative active material was within a certain range, cyclic expansion of the battery can be reduced, and low-temperature power performance and high-temperature storage performance of the battery can be further improved.

It could be seen from the results of Examples 9-12 and Examples 22-25, when the positive electrode plate comprised a certain type of positive active material, the negative electrode plate comprised both artificial graphite and natural graphite, and the compacted density of the negative electrode film and/or the areal density of the negative electrode film were within the certain range, the cyclic expansion of the battery can be reduced, and the low-temperature power performance and high-temperature storage performance of the battery can be further improved.

Described above are merely specific embodiments of the present application, but the protection scope of the present application is not limited to this. Any skilled person who is familiar with this art could readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A secondary battery, comprising a positive electrode plate and a negative electrode plate, the positive electrode plate comprising a positive electrode current collector and a positive electrode film that is disposed on at least one surface of the positive electrode current collector and comprises a positive active material, the negative electrode plate comprising a negative electrode current collector and a negative electrode film that is disposed on at least one surface of the negative electrode current collector and comprises a negative active material,
    wherein the positive active material comprises one or more of layered lithium transition metal oxides and layered lithium transition metal oxides are modified by doping and/or surface coating;

the negative active material comprises a first material and a second material, the first material comprises artificial graphite, the second material comprises natural graphite, the natural graphite has a powder resistivity of from 10.0 mΩ·cm to 14.0 mΩ·cm under a pressure of from 8 MPa;

the artificial graphite has a powder resistivity of from 11.0 mΩ·cm to 16.0 mΩ·cm under a pressure of 8 MPa; and the negative electrode plate has a resistance R satisfying 6 mΩ≤R≤12.0 mΩ.

2. The secondary battery according to claim 1, wherein the natural graphite constitutes from 10% to 50% by mass of the negative active material.

3. The secondary battery according to claim 1, wherein the negative active material has a volume average particle diameter Dv50 of from 11 μm to 15 μm.

4. The secondary battery according to claim 1, wherein the negative active material has a graphitization degree of from 92% to 96%.

5. The secondary battery according to claim 1, wherein the negative electrode film has an areal density of from 10 mg/cm² to 13 mg/cm²; and/or the negative electrode film has a compacted density of from 1.6 g/cm³ to 1.8 g/cm³.

6. The secondary battery according to claim 1, wherein the layered lithium transition metal oxide comprises one or more of lithium nickel cobalt manganese oxide, lithium nickel cobalt aluminum oxide and modified compounds thereof.

7. The secondary battery according to claim 1, wherein any two circular regions with a same area on the negative electrode plate are respectively denoted as a first region and a second region, and a distance between a center of the first region and the second region is 20 cm, and an electrode plate resistance $R_1$ of the first region and an electrode plate resistance $R_2$ of the second region satisfy: $R_1-R_2/\leq 3$.

8. An apparatus, comprising the secondary battery according to claim 1.

9. The secondary battery according to claim 1, wherein the natural graphite constitutes from 15% to 30% by mass of the negative active material.

10. The secondary battery according to claim 1, wherein the natural graphite has a powder resistivity of from 11.0 mΩ·cm to 13.0 mΩ·cm under a pressure of from 8 MPa; and/or, the artificial graphite has a powder resistivity of from 13.0 mΩ·cm to 15.0 mΩ·cm under a pressure of 8 MPa.

11. The secondary battery according to claim 1, wherein the negative active material has a volume average particle diameter Dv50 of from 12 μm to 14 μm.

12. The secondary battery according to claim 1, wherein the negative active material has a graphitization degree of from 93% to 95%.

13. The secondary battery according to claim 1, wherein the negative electrode film has an areal density of from 10.5 mg/cm² to 11.5 mg/cm²; and/or the negative electrode film has a compacted density of from 1.65 g/cm³ to 1.75 g/cm³.

14. A secondary battery, comprising a positive electrode plate and a negative electrode plate, the positive electrode plate comprising a positive electrode current collector and a positive electrode film disposed on at least one surface of the positive electrode current collector and comprises a positive active material, the negative electrode plate comprising a negative electrode current collector and a negative electrode film on at least one surface of the negative electrode current collector and comprises a negative active material, wherein the positive active material comprises layered lithium transition metal oxide;

the negative active material comprises artificial graphite and natural graphite;

the natural graphite has a mass percentage from 10% to 30% based on a total mass of the negative active material, a powder resistivity of from 10.0 mΩ·cm to 14.0 mΩ·cm under a pressure of from 8 MPa, a Dv50 from 12.4 μm to 18.2 μm, and a graphitization degree of from 92.7% to 97.2%;

the artificial graphite has a powder resistivity of from 11.0 mΩ·cm to 16.0 mΩ·cm under a pressure of 8 MPa, a Dv50 from 10.5 μm to 15.5 μm, and a graphitization degree of from 96.5% to 98.1%; and the negative electrode plate has a resistance R satisfying 6 mΩ≤R≤12 mΩ.

15. The secondary battery according to claim 1, wherein a mass ratio of the artificial graphite to the natural graphite in the negative active material is 9:1 to 75:25.

16. The secondary battery according to claim 14, wherein a mass ratio of the artificial graphite to the natural graphite in the negative active material is 9:1 to 75:25.

* * * * *